Sept. 20, 1938.            H. S. MOORADIAN            2,130,594
                              TIRE
                        Filed Dec. 19, 1936        3 Sheets-Sheet 1
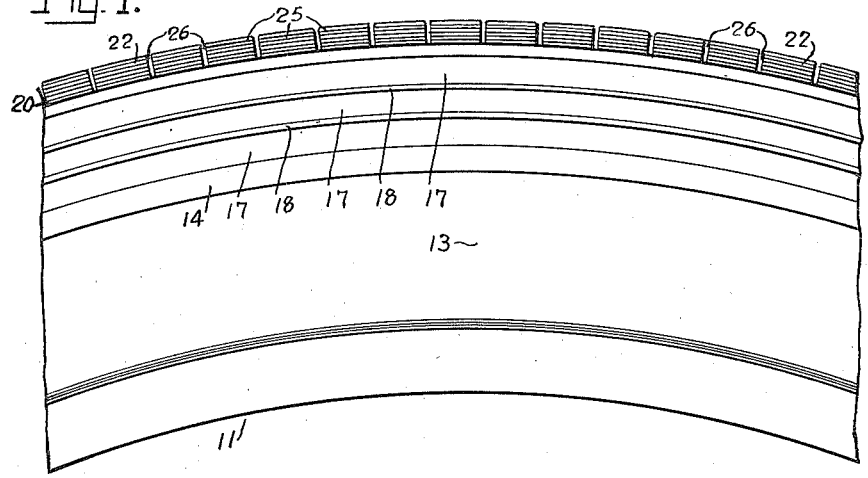
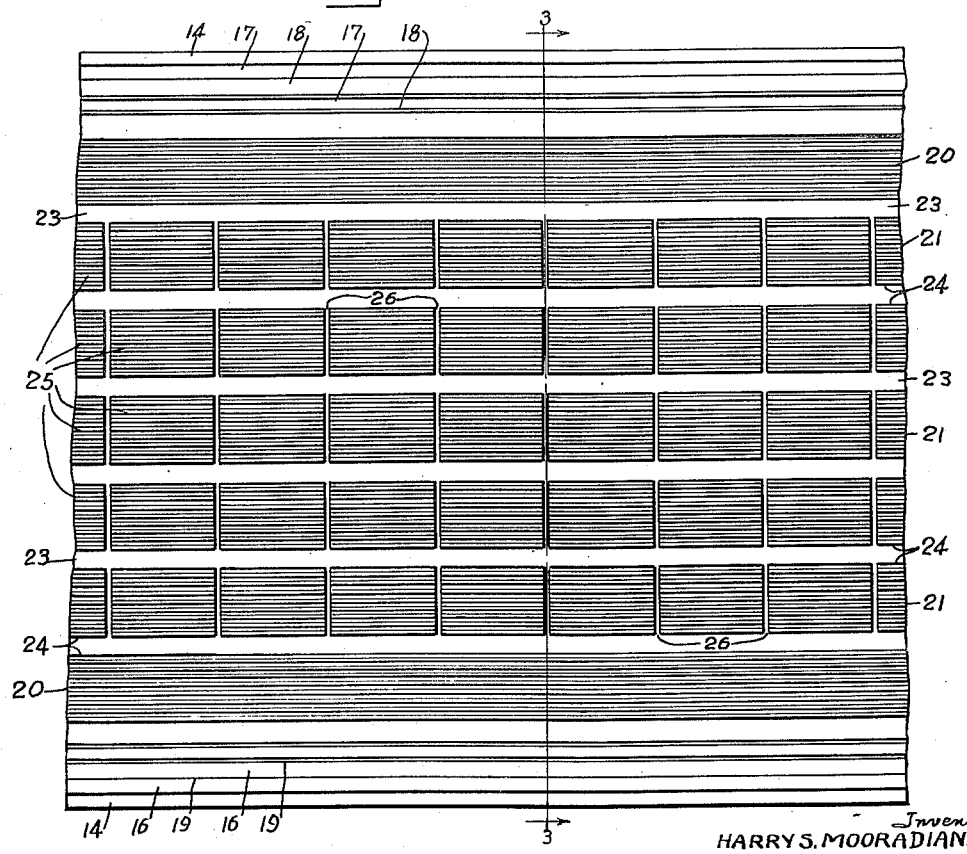
Inventor
HARRY S. MOORADIAN,
Toulmin & Toulmin
Attorneys Sept. 20, 1938. H. S. MOORADIAN 2,130,594
TIRE
Filed Dec. 19, 1936 3 Sheets-Sheet 2
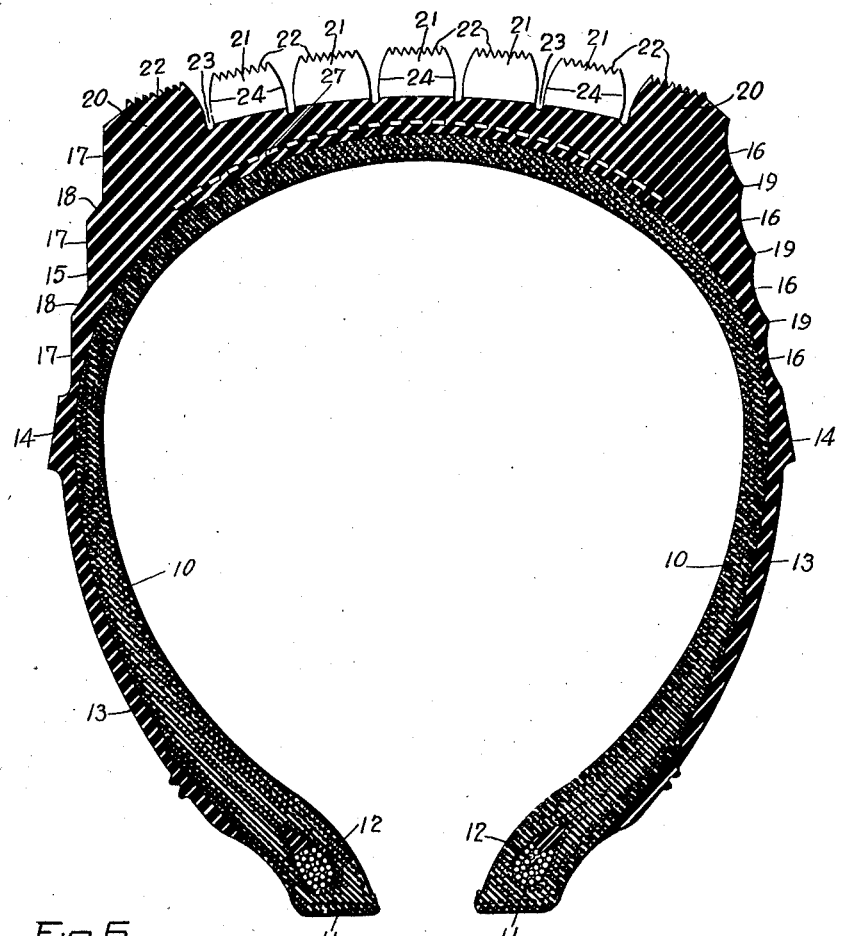
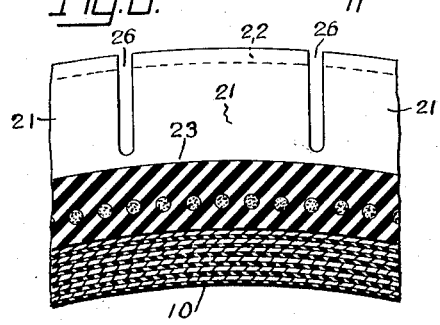
Inventor
HARRY S. MOORADIAN

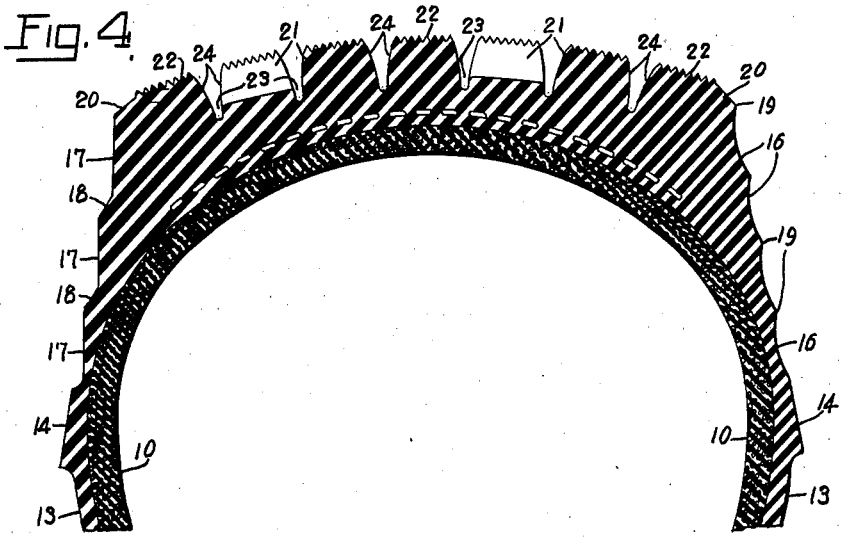
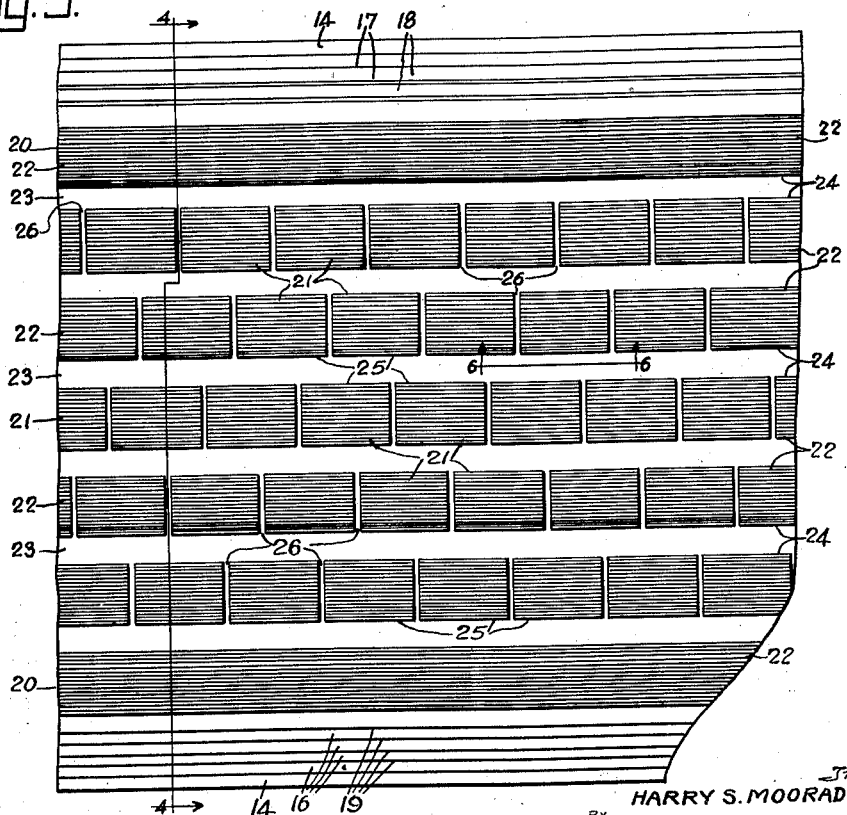

Patented Sept. 20, 1938

2,130,594

UNITED STATES PATENT OFFICE 2,130,594

TIRE

Harry S. Mooradian, Dayton, Ohio, assignor to The Dayton Rubber Mfg. Company, Dayton, Ohio, a corporation of Ohio Application December 19, 1936, Serial No. 116,769

5 Claims. (Cl. 152—209)

This invention relates to tires, and in particular, to tire tread constructions adapted to prevent or reduce skidding.

One object of this invention is to provide a tire with a tire tread adapted to reduce the skidding effect on wet streets and the like, when the brakes of the vehicle are applied, and especially to prevent the forward skid which frequently occurs under such conditions.

Another object is to provide a tire with a tread construction which is not only skid-proof to the maximum practical degree, but which also is substantially noiseless, especially when turning corners, and likewise of long life.

Another object is to provide a tire having a tread construction which is adapted to reduce the effect not only of forward skidding but also of sidewise skidding.

Another object is to provide a tire having a tread construction with slots incorporated therewith of such a shape as to reduce the tendency of small pebbles and stones to stick in the slots, and also tending to eject such pebbles or stones.

Another object is to provide a tire tread construction adapted to reduce forward skidding to a minimum amount, as well as to reduce the wear ordinarily encountered in tire treads designed for this purpose.

In the drawings:

Figure 1 is a side elevation of a portion of a tire and its tread, according to this invention.

Figure 2 is an enlarged top plan view of a portion of the tire shown in Figure 1.

Figure 3 is a cross section through the tire shown in Figure 2, taken along the line 3—3 therein.

Figure 4 is a cross section through a modification employing staggered transverse slots, taken along the line 4—4 in Figure 5.

Figure 5 is an enlarged top plan view of the modification employing staggered, transverse slots, as shown in Figure 4.

Figure 6 is an enlarged fragmentary longitudinal section along the line 6—6 in Figure 5.

Hitherto, the tires ordinarily used have been subject to defects of failing to prevent or greatly reduce skidding upon wet streets, and at the same time having a long life as regards wear. Even where tread constructions were designed to reduce or prevent this skidding, the types adopted were subject to rapid wear or else were noisy in turning corners, or in entering and leaving car tracks. If the various recesses in the tire were staggered, in the attempt to reduce wear, the tendency of the tire to prevent forward skidding was likewise reduced, thereby decreasing the efficiency of the tire. Tires having treads with broad transverse slots have been subject to wear which may be described as "heel and toe action". This action is caused by a kick-off effect as the tire tread portions flex in use, resulting in a wear like that occurring on the heel and toe of a shoe. This effect tends to create an uneven wear upon the tread and renders the construction disadvantageous for that purpose.

Attempts have been made to cut the tread transversely by a cutting machine, but with this machine it was necessary to cut the tread entirely across, and the cutting reduced the strength of the rubber. It is not considered good practice to cut a finished piece of rubber, and the cuts were subject to becoming lodging places for small stones and pebbles. Furthermore, these knife cuts tended frequently to become ragged and to start a tear. Another attempt was made to reduce skidding and at the same time to give wearing qualities to the tire by dividing the tread into a series of very narrow annular ribs. These ribs were so narrow that they were flexible and were subject to present a wavy effect under the action of the brakes, this wavy effect being said to reduce the tendency both of forward and sidewise skidding. These tires did not wear satisfactorily, however, and the newer models thereof have been provided with fewer ribs of thicker construction. This gave a less efficient skid-prevention but increased the wearing qualities of the tire.

The tire of the present invention seeks to reduce skidding in both forward and sidewise directions by providing the tire with a series of annular ribs of a moderately wide construction. The two outer ribs are substantially plain, whereas the inner ribs are slotted transversely, thereby giving a kind of checkered effect. The transverse slots are very narrow and are preferably aligned transversely in order to give the greatest non-skid effect and maximum life. Optionally, the transverse slots may be staggered, but this construction results in somewhat of a reduction in the non-skid efficiency.

Referring to the drawings in detail, Figures 1 and 3 show a portion of the tire of this invention as having a core or inner lining 10 composed of layers of cord fabric impregnated with rubber, and terminating in the beads 11 at the bottom of the tire. These beads 11 contain wires 12 running annularly therethrough and giving firmness and flexibility to the beads 11. The side walls 13 of the tire extend upwardly from the beads 11 and are provided with annular side wall projections 14, above which are grooved portions 15 and 16. The grooved portions 15 are of step-like construction, consisting of alternate substantially flat portions 17 interconnected by beveled portions 18. The grooved portions 16 are of arcuate cross section, however, and are separated by annular ribs 19. The side walls terminate upwardly in outer annular ridges 20, between which are arranged annular ribs, generally designated 21. The ribs 20 and 21, on their outer faces, are provided with a multiplicity of tiny annular corrugations 22. The annular ribs 20 extend in unbroken paths around the periphery of the tire. The ribs 20 and 21 are separated from one another by the annular grooves 23, having outwardly flared, curved side walls 24.

These continuous outer ribs 20 tend to prevent the wear resulting from a heel and toe action, because this wear is usually most severe on the outer ribs. This continuous construction of the outer ribs 20 also reduces the noise and causes less squealing as the automobile moves out of car tracks or turns corners than if the outer ribs were also cut into checkered portions by transverse grooves, similar to those dividing up the inner ribs 21.

Unlike the outer ribs 20, which are continuous around the tire, the inner ribs 21 are divided into a multiplicity of small portions 25 by means of the narrow transverse slots 26. As shown in Figure 2, the small portions 25 are of rectangular outline, and lie between the annular slots 23 and the transverse slots 26, thereby forming a large number of outwardly projecting portions of rubber. It is to be emphasized that the slots 26 are exceedingly narrow in order to reduce the previously-mentioned heel and toe action, which results in undue wear. These slots are preferably of a width of $\frac{1}{16}''$ to $\frac{1}{32}''$, and are formed in the molding operation. For this purpose the tire mold is provided with correspondingly shaped steel inserts which form these narrow slots as the rubber of the tire is forced into the recesses between them. The checkered appearance of the tire between the outer ribs 20 has an effective retardation action upon forward skidding, whereas the continuous outer ribs 20 not only reduce sidewise skidding but also promote better tread wear because these two outer ribs, particularly with knee action wheels, are able to absorb a great amount of strain. The narrowness of the slots 26 separating the portions 25 into which the inner ribs 21 are divided reduces the heel and toe action, resulting in wear, and the shape of the slots looking at them in cross section is so designed as to prevent small pebbles and stones from sticking therein, as well as to throw them out due to the duplex curves thereof. The arrangement of having the transverse slots 26 continue across the tire increases the efficiency of preventing forward skidding. Additional protection is given to the inner tube of the tire by a layer of cords, generally designated 27, positioned between the portion of the tread which engages the road and the inner portion 10 of the tire casing.

The modification shown in Figure 5 is generally similar to the form shown in Figure 2, with the exception of the fact that the narrow, transverse slots 26 separating the various groove portions 25 are not aligned transversely. In Figure 5 the transverse slots 26 are arranged in staggered positions or in echelon arrangement. This staggered arrangement of the transverse slots reduces somewhat the heel and toe effect of wear, previously mentioned, although this wear factor, as previously explained, is greatly reduced by the provision of the narrow molded slots employed in the present invention, as contrasted with the broad grooves employed in the prior art.

It will be understood that I desire to comprehend within this invention such modifications as come within the scope of the claims and the invention.

Having thus fully described my invention, what I claim as new and desire to secure by Letters Patent, is:

1. In a tire, a tread construction comprising a plurality of annular ribs separated by annular grooves and subdivided by transverse slots, said transverse slots being relatively narrow in width as compared with the widths of said grooves and with the size of the rib subdivisions and arranged in an echelon position across the tire tread, the widths of said slots being also relatively small in proportion to the depths thereof.

2. In a tire, a tread construction comprising a plurality of annular ribs separated by annular grooves and subdivided by transverse slots, certain of said transverse slots being arranged in staggered positions across the tire tread, said slots being relatively narrow in width in comparison with the widths of said grooves, the widths of said slots being also relatively small in proportion to the depths thereof.

3. In a tire, a tread construction comprising a plurality of annular ribs separated by annular grooves and subdivided by transverse slots arranged in echelon formation across the tire, said transverse slots being relatively narrow in width in proportion to the widths of said grooves and to the depths of said slots and unslotted annular ribs arranged at the lateral margins of said tread outside said slotted ribs.

4. In a tire, a tread construction comprising a plurality of annular ribs separated by annular grooves and subdivided by transverse slots into a multiplicity of projections, each projection being of relatively short peripheral extent, said transverse slots being arranged in stepped positions transversely across the tire, and a pair of transversely unslotted ribs associated with said centrally disposed ribs and arranged on opposite sides thereof, said slots being relatively narrow in width in comparison with the widths of said grooves, the widths of said slots being also relatively small in proportion to the depths thereof.

5. In a tire, a tread construction comprising a plurality of annular ribs separated by annular grooves and subdivided by transverse slots molded into the ribs, said slots being disposed in staggered sequence across the tread, said slotted ribs being bounded at each margin of said tread by an unslotted rib, said slots being relatively narrow in width in comparison with the widths of said grooves, the widths of said slots being also relatively small in proportion to the depths thereof.

HARRY S. MOORADIAN.